US009244544B2

(12) United States Patent
Matsuki (10) Patent No.: US 9,244,544 B2
(45) Date of Patent: Jan. 26, 2016

(54) USER INTERFACE DEVICE WITH TOUCH PAD ENABLING ORIGINAL IMAGE TO BE DISPLAYED IN REDUCTION WITHIN TOUCH-INPUT SCREEN, AND INPUT-ACTION PROCESSING METHOD AND PROGRAM

(75) Inventor: Tomoaki Matsuki, Tokyo (JP)

(73) Assignee: KDDI CORPORATION, Tokyo (JP)

( * ) Notice: Subject to any disclaimer, the term of this patent is extended or adjusted under 35 U.S.C. 154(b) by 64 days.

(21) Appl. No.: 14/233,518

(22) PCT Filed: Jun. 29, 2012

(86) PCT No.: PCT/JP2012/066736
§ 371 (c)(1),
(2), (4) Date: Jan. 17, 2014

(87) PCT Pub. No.: WO2013/018480
PCT Pub. Date: Feb. 7, 2013

(65) Prior Publication Data
US 2014/0160073 A1   Jun. 12, 2014

(30) Foreign Application Priority Data
Jul. 29, 2011 (JP) ................................. 2011-166608

(51) Int. Cl.
*G06F 3/01* (2006.01)
*G06F 3/0354* (2013.01)
(Continued)

(52) U.S. Cl.
CPC ............ *G06F 3/03547* (2013.01); *G06F 3/016* (2013.01); *G06F 3/0414* (2013.01);
(Continued)

(58) Field of Classification Search
CPC ....... G06F 3/0354; G06F 3/01; G06F 4/0488; G06F 3/041
See application file for complete search history.

(56) References Cited

U.S. PATENT DOCUMENTS

| 5,455,906 A | 10/1995 | Usuda |
| 6,118,435 A | 9/2000 | Fujita et al. |

(Continued)

FOREIGN PATENT DOCUMENTS

| JP | A-05-330289 | 12/1993 |
| JP | A-09-198352 | 7/1997 |

(Continued)

OTHER PUBLICATIONS

Oct. 2, 2012 International Search Report issued in International Application No. PCT/JP2012/066736.
(Continued)

*Primary Examiner* — Tony N Ngo
(74) *Attorney, Agent, or Firm* — Oliff PLC (57) ABSTRACT

A process is disclosed for displaying an image on a display screen and recognizing a user's input by the user's finger touch on a touch screen, the process including: a first step of displaying an original image; a second step of forming a screen pad, such that a reference image, which is a reduced duplicate of the original image, is displayed on the screen pad within the display screen, such that the reference image is overlaid with the original image, in a translucent mode that renders the original image visible through the reference image, or an opaque mode where the original image is not visible. The reference image is obtained by reducing the original image with or without image simplification. A third step, in response to the user touching the screen pad, detects finger position on the screen pad, and recognizes the user's input based on the detected finger position.

17 Claims, 5 Drawing Sheets (51) Int. Cl.
 *G06F 3/0485* (2013.01)
 *G06F 3/0488* (2013.01)
 *G06F 3/041* (2006.01)
(52) U.S. Cl.
 CPC .......... *G06F3/0485* (2013.01); *G06F 3/04883* (2013.01); *G06F 3/04886* (2013.01); *G06F 2203/04105* (2013.01)

(56) References Cited

U.S. PATENT DOCUMENTS

| 2003/0006973 | A1 | 1/2003 | Omura et al. | |
|---|---|---|---|---|
| 2007/0097093 | A1 | 5/2007 | Ohshita et al. | |
| 2010/0137031 | A1* | 6/2010 | Griffin et al. | 455/566 |

FOREIGN PATENT DOCUMENTS

| JP | A-10-293644 | 11/1998 |
|---|---|---|
| JP | A-2000-105671 | 4/2000 |
| JP | A-2004-151987 | 5/2004 |
| JP | A 2007-503052 | 2/2007 |
| JP | A-2007-122459 | 5/2007 |
| JP | A 2008-257374 | 10/2008 |
| JP | A-2010-211352 | 9/2010 |
| WO | WO 2005/19987 A2 | 3/2005 |
| WO | WO 2012/077273 A1 | 6/2012 |

OTHER PUBLICATIONS

Sep. 25, 2012 Office Action issued in Japanese Patent Application No. 2011-166608 (with partial translation).

Feb. 18, 2013 Office Action issued in Japanese Patent Application No. 2011-166608 (with partial translation).

Feb. 4, 2014 International Preliminary Report on Patentability issued in International Patent Application No. PCT/JP2012/066736.

Jul. 29, 2015 Office Action issued in U.S. Appl. No. 14/129,740.

Aug. 14, 2015 Office Action issued in U.S. Appl. No. 14/001,586.

* cited by examiner

USER INTERFACE DEVICE WITH TOUCH PAD ENABLING ORIGINAL IMAGE TO BE DISPLAYED IN REDUCTION WITHIN TOUCH-INPUT SCREEN, AND INPUT-ACTION PROCESSING METHOD AND PROGRAM

TECHNICAL FIELD

The invention relates to techniques directed to user interface devices for displaying an image on a display screen and for allowing a user to perform an input operation or motion through the user's manipulation on a touch screen with the user's finger in association with the displayed image.

BACKGROUND ART

User interface devices have been widespread, which enable a user's input motion or operation by manipulating a display screen with the user's finger, stylus, etc. Notably, in recent years, an increasing number of mobile information devices typified by such as smart phones, tablet computers, electronic books or PDAs (Personal Digital Assistants) have incorporated touch panels serving as a user interface device that receives the user's finger motion as an input signal.

Irrespective of whether a touch panel is incorporated or not, a mobile information device needs to be downsized for a greater mobility. Due to this, in case a mobile information device is equipped with a user interface device in the form of a plurality of physical input keys or buttons, these keys themselves need to be reduced in size, resulting in a risk that the operability of the mobile information device becomes poorer. In contrast, in case a mobile information device is equipped with a user interface device in the form of a touch panel using a plurality of virtual buttons instead of physical buttons, these virtual buttons can be well adjusted in size depending on functions assigned to these buttons, with a greater capability of improving the operability or maneuverability of the mobile information device.

A touch-panel input is created by a pointing action in which a finger is touched to the touch panel and points a given location on the touch panel. For this pointing action to ensure that a desired operation or function is invoked with the aid of a computer connected to the touch panel, correct pointing of a given target region on a display screen is crucial.

To achieve this, correct finger-pointing of a target area is needed, even in an example case in which a correct pointing action is difficult to be created due to the target area being too small on a screen, because, for example, the finger is needed to point a location close to a region of a displayed image on the screen, which is close to edges of the screen, or the finger is needed to point a location on a fine pattern of the displayed image.

To deal with these needs, a technique of allowing a user to enter a cursor-designated coordinate point only using a finger is disclosed in, for example, Patent Document No. 1. This technique allows a user to move a finger-touch position on a screen in order to move a cursor figure which is located at a position opposite to the finger-touch position with respect to a stationary reference point, to thereby enter a cursor-designated coordinate point.

Further, a mobile information communication device has been also proposed, which has a track pad disposed on one of both faces of this device, opposite to the face on which a display unit is disposed (see Patent Document No. 2). This device allows a user to hold a housing of this device with the user's one hand, and allows the user to perform input actions by touching the track pad of this device with a finger of the same hand holding this device. It is said that this allows the user to manipulate this device with the one hand's finger to thereby designate a given target point.

PRIOR-ART REFERENCES

Patent Documents

Patent Document No. 1: Japanese Patent Application Publication No. 2010-211352
Patent Document No. 2: Japanese Patent Application Publication No. HEI 9-198352

SUMMARY OF THE INVENTION

Problem(s) that the Invention Attempts to Solve

Those conventional techniques, however, still remain it difficult for a user to designate or point any desired point on a screen with a finger of the same hand that holds a mobile information device.

In particular, in recent years, for a user's easier viewing of various sets of large-size information that are displayed, many devices are designed to have a display screen with an area large enough to cover almost all of a front face of each device. Incases where, while holding such a device with a user's one hand, the user attempts to operate the device with a finger of the same hand, it is actually only a thumb among all fingers of the same hand that is not used for holding the device, and so the thumb can be more flexibly moved than other fingers.

The thumb, however, relative to other fingers, is generally so short that a user is difficult in moving the thumb to reach a far-side one of widthwise-opposed edge areas of an image displayed on a large screen of a device (i.e., a right-hand edge area and a lift-hand edge area), which is farther away from the thumb of the user's one-hand holding the device, or in moving the thumb to reach a position close to the far-side edge area.

The difficulty could not be easily overcome by the technology disclosed is such as Patent Document Nos. 1 and 2. For example, the technology disclosed in Patent Document No. 1 is originally intended to be for use in a stationary information device such as an automobile navigation system, without covering other uses of the information device that a user holds the information device with one hand and manipulates the information device with a finger of the same hand. This is the reason why the Patent Document is intended to perform a complicated operation in which a picture indicative of a stationary reference point is displayed, and a cursor figure is moved by the user's touch motion performed at an opposite position to a target position with respect to the stationary reference point, and this operation cannot be easily achieved by the thumb's motion.

In addition, indeed the technology disclosed in Patent Document No. 2 is intended to accommodate a user's action in which a user holds a device with one hand and manipulates the device with a finger of the same one-hand. But the user is required to touch a finger on a track pad on the back face of the device, and therefore, the finger is, for example, a middle finger or a ring finger which is used to hold the device, other than the thumb, and is undoubtedly more difficult to be moved by the user than the thumb.

Then, the object of the present invention is to provide a user interface device, a method for processing input actions, and the associated computer program, each of which allows a user to designate any desired position within a screen of a device, irrespective of where the position is, with improved ease, during a period in which the user is holding the device with one hand and is manipulating the device with a finger of the same hand.

Means or Steps for Solving the Problem(s)

The following modes are provided by the invention. These modes will be stated below such that these modes are divided into sections and are numbered, such that these modes depend upon other mode(s), where appropriate, and such that each mode in such a dependent form permits each technical feature set forth in each mode to be independent or separate according to the nature of the corresponding technical feature, where appropriate.

(1) A user interface device operable to perform a display function of displaying an image on a display screen, and a touch panel function of outputting successive locations of the user's finger touch point on a touch screen over time, comprising:

a screen-pad controller configured to display a reference image on the display screen to form a screen pad, such that the reference image is a reduced duplicate of an original image being displayed on the display screen;

a touch determining unit configured to determine whether or not the finger has been touched to the screen pad;

a pointer displaying unit configured to be operable in response to the touch determining unit determining that the finger has been touched to the screen pad, to display a pointer on the original image being displayed on the display screen, to indicate a location on the display screen, which corresponds to a position at which the user has touched the finger to the screen pad; and an operation controller configured to invoke an operation associated with the location that the pointer is indicating.

(2) The user interface device according to mode (1), wherein the operation controller is configured to invoke the same operation that will occur in the user interface device if the user touches the finger to the display screen at a same position as an initial position that the pointer took, and then swipes the finger across the original image being displayed on the display screen, along a same track that the pointer took after the initial position.

(3) The user interface device according to mode (1) or (2), wherein the screen pad is displayed on the display screen at a position that allows the user who is holding the mobile information device using the user's one hand in an attempt to manipulate the mobile information device using the one hand of the user, to reach any location on the screen pad using a finger of the one hand of the user.

(4) The user interface device according to any one of modes (1) to (3), wherein the touch determining unit is configured to be operable in response to the user touching the finger to the screen pad, to determine whether or not a stationary-touch duration during which the finger touch point is held substantially stationarily on the screen pad is equal to or longer than a predetermined duration, and the operation controller is configured to operable in response to the touch determining unit determining that the stationary-touch duration is equal to or longer than the predetermined duration, to activate a touch focus mode for monitoring successive locations of the finger touch point on the screen pad, with the images held stationarily on the display screen.

(5) The user interface device according to mode (4), wherein the operation controller is configured to be operable in response to an event occurring in which, during the touch focus mode, the pointer indicates a region of an object being displayed, which object is user-selectable and is included in the original image, to determine that the user has performed a focus motion to select the object, and then invoke an operation associated with the object.

(6) The user interface device according to mode (4) or (5), further comprising:

a pressing-force sensor detecting a pressing force with which the finger presses the touch panel; and a pressing-force determining unit configured to determine whether or not the detected pressing-force is equal to or larger than a predetermined threshold, wherein the operation controller is configured to be operable in response to an event occurring in which, during the touch focus mode, the pointer indicates a region of an object being displayed, which object is user-selectable and is included in the original image, and in which the detected pressing-force is equal to or larger than the predetermined threshold, to determine that the user has performed a click motion to invoke an function pre-assigned to the object, and then invoke an operation associated with the object.

(7) The user interface device according to mode (6), further comprising:

a haptic feedback arrangement configured to impart haptic feedback to the user's finger in touch with the touch panel; and a haptic feedback controller configured to control the haptic feedback arrangement to impart the haptic feedback to the finger via the touch panel.

(8) The user interface device according to any one of modes (1) to (3), further comprising:

a pressing-force sensor detecting a pressing force with which the finger presses the touch panel; and a pressing-force determining unit configured to determine whether or not the detected pressing-force is equal to or larger than a predetermined threshold, wherein the operation controller is configured to be operable in response to the touch determining unit determining that, before a predetermined length of time elapses after the finger starts being touched to the screen pad, the finger starts moving in touch with the screen pad, and then the finger stops moving, to determine that the user has performed a drag click motion in the form of a succession of a first motion for moving the images in coordination with a movement of the finger, and a second motion for further moving the images at a rate variable as a function of a magnitude of the pressing force after the drag motion ends, and then invoke an operation associated with the drag click motion.

(9) The user interface device according to any one of modes (1) to (8), wherein the operation controller is configured to be operable in response to the user touching the finger to the display screen at a location away from a region of the screen pad being displayed, to invoke a same operation that would be invoked in the mobile information device if the user touched the finger to the display screen at a same location as the away location in an absence of the screen pad on the display screen.

(10) A method of processing a user's inputs on a user interface device operable to perform a display function of displaying an image on a display screen, and a touch panel function of outputting successive locations of the user's finger touch point on a touch screen over time, the method comprising:

a first step of displaying a reference image on the display screen to form a screen pad, such that the reference image is a reduced duplicate of an original image being displayed on the display screen;

a second step of determining whether or not the finger has been touched to the screen pad;

a third step, operable in response to a determination being made that that the finger has been touched to the screen pad, of displaying a pointer on the original image being displayed on the display screen, to indicate a location on the display screen, which corresponds to a position at which the user has touched the finger to the screen pad; and a fourth step of invoking an operation associated with the location that the pointer is indicating.

(11) A method of processing a user's inputs on a user interface device configured to display an image on a display screen and recognize a user's input by the user's finger touch on a touch screen in association with the displayed image, the process comprising:

a first step of displaying an original image on the display screen;

a second step of forming a screen pad defined as an in-screen touch pad, such that a reference image in the form of a reduced duplicate of the original image being displayed is displayed on the screen pad within the display screen, in a manner that the reference image is overlaid with the original image, in a translucent mode that renders the original image visible through the reference image, or an opaque mode that fails to render the original image visible through the reference image, wherein the reference image is obtained by reducing the original image with or without image simplification; and a third step, operable in response to the user touching the finger to the screen pad, of detecting the finger touch position on the screen pad, and then recognizing the user's input based on the detected finger touch position.

(12) A program to be executed by a computer to perform the method according to mode (10) or (11).

Advantageous Effects of the Invention

A user interface device according to the present invention allows a user to designate any desired position within a screen of a device, irrespective of where the position is, with improved ease, during a period in which the user is holding the device with one hand and is manipulating the device with a finger of the same hand, and the same holds true for a method of processing input actions and the associated program, each of which is according to the present invention.

MODES FOR CARRYING OUT THE INVENTION

Illustrative embodiments of the invention will be described below with reference to the drawings.

User interface devices to which the invention is directed are featured in that an original image is displayed on a screen that allows a user to input positions using the user's finger in association with an image, along with a reference image obtained by reducing the same as the original image, to thereby constitute a screen pad on which the reference image is displayed, within the screen on which the original image is displayed.

In this regard, in case a "screen on which an original image is displayed and touch inputs can be created" is referred to as "first touch screen," it is possible to refer to a portion of the same screen, which is for displaying the reference image (i.e., the portion constitutes the screen pad), and which serves as a miniature of the first touch screen, as "second touch screen." However, in the specification, the portion will be referred to as "screen pad," as mentioned above, in a sense that the portion serves as a touch pad formed within the touch-input screen for displaying an original image.

One implementation of the invention allows a user to touch the screen pad with the user's finger while viewing a reference image displayed on the screen pad, to thereby perform an equivalent action to the user's direct touch on the original image on the display using the same finger. The reference image is one to be referenced by the user for supporting the user principally in performing an input action, and the reference image is typically created by displaying the same as the original image with a smaller scale factor than that of the original image.

In this regard, the term "original image" refers to a portion of a full image representative of full information to be displayed on the screen of a display, wherein the portion contains subjects to be selected by the user with the finger. Naturally, the subjects to be selected can be pictures displayed on the screen. In an example, a partial image referring to a portion of the displayed image, which represents a region on which an array of a plurality of icons are displayed falls within the portion containing subjects to be selected. In addition, the term "original image" can be defined so as not to cover function-displaying regions of the displayed image, including, such as, a time indicator, a battery level indicator, a signal strength indicator or the like.

A user interface device to which the invention is directed allows a user to hold the user interface device with one hand, and to enter information by touching a screen pad with a finger of the same one-hand. Because of this, each of a majority of user interface devices of this type is incorporated in a mobile information device that can be held and manipulated by a user with one hand, such as a smart phone or a tablet computer. Under these circumstances, an illustrative embodiment of the invention will be described below by taking examples of user interface devices which embodies the invention and are incorporated in mobile information devices.

Figure 1A:
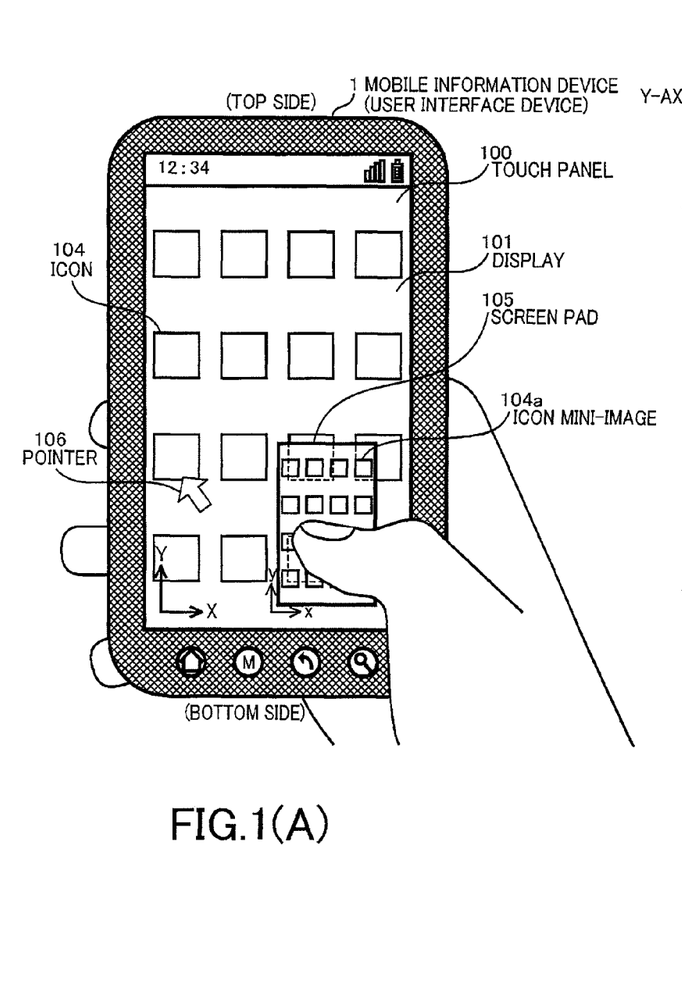
FIG. 1(A) is a front view illustrating a mobile information device according to an illustrative embodiment of the invention, with a screen pad being displayed.
Figure 1B:
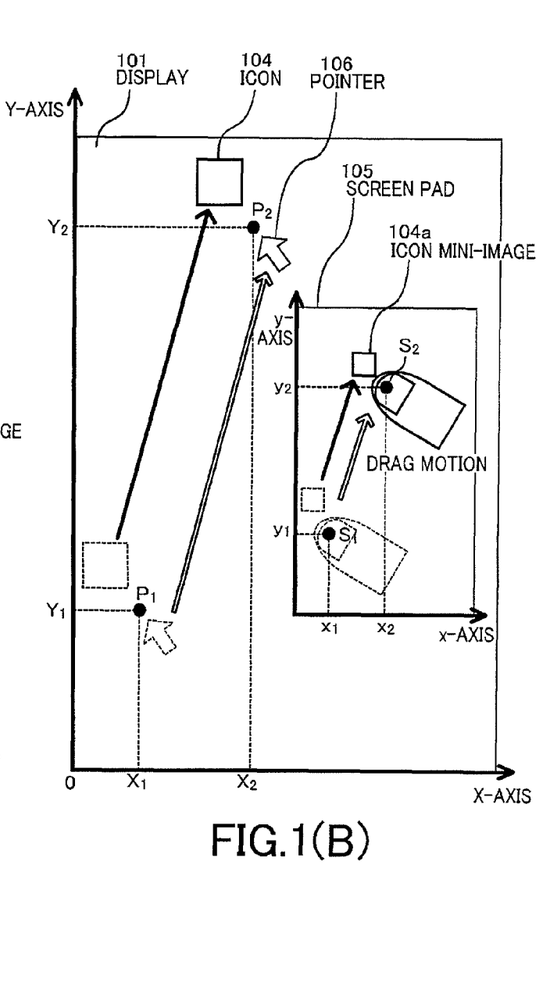
FIG. 1(B) is a schematic diagram illustrating a user's finger action on the mobile information device, together with a geometrical correspondence between the finger's touch positions and positions indicated by a pointer.

FIG. 1 is a front view illustrating a mobile information device 1 according to an embodiment of the invention, with a screen pad 105 displayed, along with a schematic diagram illustrating a user's finger motion on the mobile information device 1.

More specifically, FIG. 1(A) illustrates the mobile information device 1 with the screen pad 105 (The horizontal axis represents an x-axis, and the vertical axis represents a y-axis) displayed in an overlaid mode within a screen of a display 101 (The horizontal axis represents an X-axis, and the vertical axis represents a Y-axis). As illustrated in this drawing, the mobile information device 1 is equipped with the display 101 for displaying an image, and a touch panel 100 disposed over the screen of the display 101.

It is noted that, in the present embodiment having the display 101 and the touch panel 100 in the form of separate layers that are laminated together, the display 101 and the touch panel 1005 may be in the form of a unitary component, for example, by designing the display 101 combined with a position input function.

In addition, an original image displayed on the display 101 contains a plurality of icons 104. Each icon 104 is a subject to be selected by the user to invoke the associated application (i.e., an example of a visual object). The user can select a desired one of the icons 104 to activate the associated application, by directly touching the screen at the desired one of the icons 104.

Like the touch panel 100, the screen pad 105 has a display function and a position input function. Of these functions, the display function is provided by a portion of the display 101 with which the screen pad 105 is overlaid, and the position input function is provided by a portion of the touch panel 100 with which the screen pad 105 is overlaid. That is, the screen pad 105 is constructed with both the display 101 and the touch panel 100.

<Relationship Between Original Image Displayed on Display 101 and Reference Image Displayed on Screen Pad 105>

The screen pad 105 is displayed on a portion of the screen of the display 101, which is a region on which a reduced version or a miniature of an original image being displayed on the screen of the display 101 is displayed. An image displayed on the screen pad 105 (i.e., a reference image) may have a similar shape with that of an original image displayed on the screen of the display 101, which is obtained by reducing the original image by a scale factor below one. More specifically, a reduction scale factor from the original image to the reference image along the horizontal axis of the mobile information device 1 (i.e., the x- and X-axes) and a reduction scale factor from the original image to the reference image along the vertical axis of the mobile information device 1 (i.e., the y- and Y-axes) may be equal to each other, but alternatively may be different from each other.

As illustrated in FIG. 1(A), an original image and the screen pad 105 (i.e., a reference image) are displayed on the same screen such that the screen pad 105 is overlaid with the original image. In this layout, an overlapping region of the original image with the screen pad 105 may be displayed so as to be seen through the screen pad 105, or so as to be unseen by being hidden with the screen pad 105.

In addition, an outer periphery of the screen pad 105 may have any one of a variety of shapes including a rectangular, a diamond, any other polygon, any one of modified polygons by rounding their corners, an oval, a round, and the like.

In any event, a plurality of icon mini-images 104a respectively corresponding to a plurality of icons 104 are displayed on the screen pad 105 (i.e., each icon mini-image 104a is an image obtained by reducing the original figure of the corresponding icon 104 without any modification, but alternatively may be an image obtained by deforming or simplifying the original shape of the corresponding icon 104).

The user holds the mobile information device 1 with one hand (i.e., the user's right hand for an example depicted in FIG. 1(A)), and touches the thumb of the same hand to the screen pad 105 (i.e., a region of the touch panel 100, on which the screen pad 105 is displayed). The thumb is not used for holding the mobile information device 1, still remaining greater flexibility of movements by the user than other fingers, and so is more suitable for the user to operate the mobile information device 1 than when the user uses other fingers. If this thumb is touched with, for example, any one of the icon mini-images 104a being displayed within the screen pad 105, then a pointer 106 is displayed on the screen (i.e., outside a region of the touch pad 100, in which the screen pad 105 is being displayed on the touch pad 100) to point one of the icons 105 which corresponds to the touched icon mini-image 104a.

If the thumb is touched with any one of the icon mini-images 104a, then the same operation is invoked that will be invoked if the same thumb is touched with one of the icons 104 which the pointer 106 is pointing. More specifically, for example, if the finger is touched with any one of the icon mini-images 104a, then it is determined that an equivalent action to a focus motion which is performed to select the corresponding icon 104 to the touched icon mini-image 104a, as elaborated below, resulting in a selection operation being invoked. The selection operation can be, for example, highlighting the corresponding icon 104 to allow the user to view the corresponding icon 104 as if it were displaced above the surface of the screen, or to allow the user to view the corresponding icon 104 more brightly than other icons 104.

<How to Select Position at which Screen Pad 105 is Displayed within Screen of Display 101>

In the present embodiment, the screen pad 105 is displayed within the screen of the display 101 at a user-adjustable position, and is preferably displayed at a position that allows the thumb of the same one-hand of the user holding the mobile information device 1 to reach any location on the screen pad 105. This arrangement is advantageous, for example, when the thumb cannot reach and directly touch a target icon 104, because this arrangement allows the user to touch the counterpart icon mini-image 104a with the thumb instead of touching the target icon 104, to thereby invoke an operation equivalent to an operation to be invoked in response to direct touch with the target icon 104.

It is noted that, as described above, the reference image displayed on the screen pad 105 (containing the plurality of icon mini-images 104a) is preferably translucent. This allows the user to view through the screen pad 105, a portion of the original image being displayed on the display 101, which is overlapped with the screen pad 105, resulting in ensuring that the user views the entire original-image like when the screen pad 105 is absent.

In addition, it is preferable that the user can choose one of a display mode and a non-display mode of the screen pad 105. In the non-display mode of the screen pad 105, the entire original-image can be viewed without being blocked by anything. In this mode, the screen pad 105 is functionally disabled, and the user touches the finger directly to the original image for input action.

<How User Activates Screen Pad 105>

To activate the screen pad 105, the user, for example, invokes a predetermined one of the icons with the finger, or depresses a physical button attached to the mobile information device 1. ON the other hand, to deactivate the screen pad 105, the user, for example, invokes a predetermined one of the icon mini-images 104a being displayed within the screen pad 105, using the finger.

<Various Forms of Drag Motion>

In the present embodiment, the user can perform a drag motion for an image in any one of various modes. More specifically, the entire original image can be dragged within the screen of the display 101, and the entire screen pad 105 can be moved as a result of a drag motion within the screen of the display 101, relative to the position of the original image being displayed. The entire image (i.e., the reference image) displayed within the screen pad 105 can be moved as a result of a drag motion, relative to the position of the outer periphery of the screen pad 105. In this mode, as the reference image is moved, the original image is moved as well in coordination with the movement of the reference image.

<Drag Motion for Screen Pad 105>

As described above, in the present embodiment, the user can change the position of the screen pad 105 being displayed on the screen of the display 101. More specifically, the screen pad 105, in response to a drag motion being performed therefor (which is separate from a drag motion for each icon mini-image 104a within the screen pad 105), moves within the screen of the display 101 (i.e., on the original image) to any desired position within the screen of the display 101.

To achieve the movement, the user, for example, touches the finger to any one of edge areas of the reference image on the screen pad 105, or a predetermined region within the reference image on the screen pad 105 (e.g., a region away from any one of the icon mini-images 104a), and then moves the finger in touch with the same area to thereby drag the screen pad 105.

<Creation of Reference Image on Screen Pad 105>

To create the reference image on the screen pad 105, it is preferable that the user can vary a reduction scale factor by which the original image is reduced on the screen of the display 101. Further, it is also preferable that the user can vary a reduction scale factor "a" from the original image to the reference image along the horizontal axis of the mobile information device 1 (i.e., the x- and X-axes) and a reduction scale factor "β" from the original image to the reference image along the vertical axis of the mobile information device 1 (i.e., the y- and Y-axes) independently of each other.

The adjustment of the reduction scale factor is performed by the user action of, for example, touching the finger to a marker or slider displayed on the screen pad 105 (e.g., a marker displayed at one or more of four corners of the screen pad 105, or a marker displayed at a determined position on either one or both of a pair of opposing edges of the screen pad 105 (e.g., an intermediate position on the selected edge along the length)), and then moving the finger in touch with the screen pad 105.

Additionally, if the user touches the finger to a position which is located on the screen of the display 101 and outside the display area of the screen pad 105, then an operation will be invoked which is the same that is originally intended to be invoked in response to the finger touch on the same position. For example, if the finger touches the finger to any one of the icons 104 located away from the screen pad 105, then it will be determined that a focus motion as described below has been performed, resulting in a selection operation being activated to select the touched icon 104.

<Correspondence Between Movement of Finger Touch Point on Screen Pad 105 and Movement of Pointer 106 on Original Image>

FIG. 1(B) illustrates a geometrical correspondence between the thumb's touch positions and positions indicated by the pointer 106. In an example depicted in FIG. 1(B), the thumb moves in touch with the screen pad 105, resulting in the movement of the touch point from Point $S_1$ to $S_2$ within the screen pad 105. In coordination with this movement, the pointer 106 moves as well, resulting in, more specifically, the movement of the position indicated by the pointer 106 from Point $P_1$ to $P_2$ within the screen of the display 101.

In the example depicted in FIG. 1(B), the screen pad 105 is assigned the first quadrant of an x-y coordinate system (the origin is located at the bottom-left corner, and the vertical and horizontal axes are positive). Similarly, the screen of the display 101 is assigned the first quadrant of an X-Y coordinate system, in combination with a scale indicative of the same scale factor as that of the x-y coordinate system (scale factors are indicative of ratios between a dimension in the real world and corresponding dimensions in the coordinate systems).

As a result, some points described above are defined by the following two-dimensional coordinate values:

(a) Point $S_1$: $(x_1, y_1)$, Point $S_2$: $(x_2, y_2)$ and
(b) Point $P_1$: $(X_1, Y_1)$, Point $P_2$: $(X_2, Y_2)$.

In this case, these coordinate values have the following correlation:

(c) $X_1 = \alpha^{-1} \cdot x_1$, $Y_1 = \beta^{-1} \cdot y_1$, and
(d) $X_2 = \alpha^{-1} \cdot x_2$, $Y_2 = \beta^{-1} \cdot y_2$.

In this regard, the "α" denotes a reduction scale factor (larger than one) by which the original image on the screen of the display 101 is reduced along the horizontal axes (the x- and X-axes) for creating the reference image on the screen pad 105. In addition, the "β" denotes a reduction scale factor (larger than one) by which the original image on the screen of the display 101 is reduced along the vertical axes (the y- and Y-axes) for creating the reference image on the screen pad 105. The inverse of the reduction scale factor α, namely, $\alpha^{-1}$, denotes an enlargement scale factor from the reference image to the original image for restoration of the original image, while the inverse of the reduction scale factor β, namely, $\beta^{-1}$, denotes an enlargement scale factor from the reference image to the original image for restoration of the original image. For example, if the screen pad 105 is similar to the screen of the display 101 with a scale factor of ⅓, then $\alpha^{-1} = \beta^{-1} = 3$.

Referring back to FIG. 1(B), in the example depicted in this drawing, just after touching down to Point $S_1$, the thumb moves to Point $S_2$ while being held in touch. This movement falls within a so-called drag motion performed within the screen pad 105. As a result of this drag motion, an image containing the plurality of icon mini-images 104a moves in a direction from Point $S_1$ to $S_2$ by a distance between Points $S_1$ and $S_2$, within the screen pad 105.

As the thumb's touch point moves in this manner, the pointer 106 (more precisely, the position indicated by the pointer 106) moves from Point $P_1$ to $P_2$. As a result, the entire original image containing the plurality of icons 104 moves in a direction from Point $P_1$ to $P_2$ by a distance between Points $P_1$ and $P_2$, as well. This movement is equivalent to a movement invoked by a drag motion, if performed by moving the finger from Point $P_1$ to $P_2$ while being held in touch. Thus, a drag motion for the screen pad 105 invokes a concurrent drag motion for the original image.

More specifically, the use of the screen pad 105 allows the same operation to be invoked, that will occur if the user touches the finger to the screen of the display 101 at a same position that the pointer 106 initially took, and then moves the finger on the original image being displayed on the screen of the display 101, along a same path or track that the pointer 106 subsequently took.

<Variations of Motion that User can Take on Screen Pad 105>

Additional variations of a motion that the user can take via the screen pad 105 will be described below. These additional variations include the followings, for example:

(1) Focus Motion: User's motion taken to select one of objects such as the plurality of icons
(2) Click Motion: User's motion taken to invoke a function pre-assigned to the selected object (3) Drag Click Action: User's action taken after a drag motion ends, to continue scrolling the entire image by pressing the touch panel 100 with the same finger that was used for the drag motion, without releasing the finger from the touch panel 100

In this regard, the (1) Focus Motion and the (2) Click Motion can be taken during a touch focus mode described below in detail.

It is of course that the mobile information device 1 may be designed to further accommodate other types of conventional user motions, such as a flick motion, a pinch-in motion and a pinch-out motion, via the screen pad 105.

<Description of Touch Focus Mode>

Figure 2A:
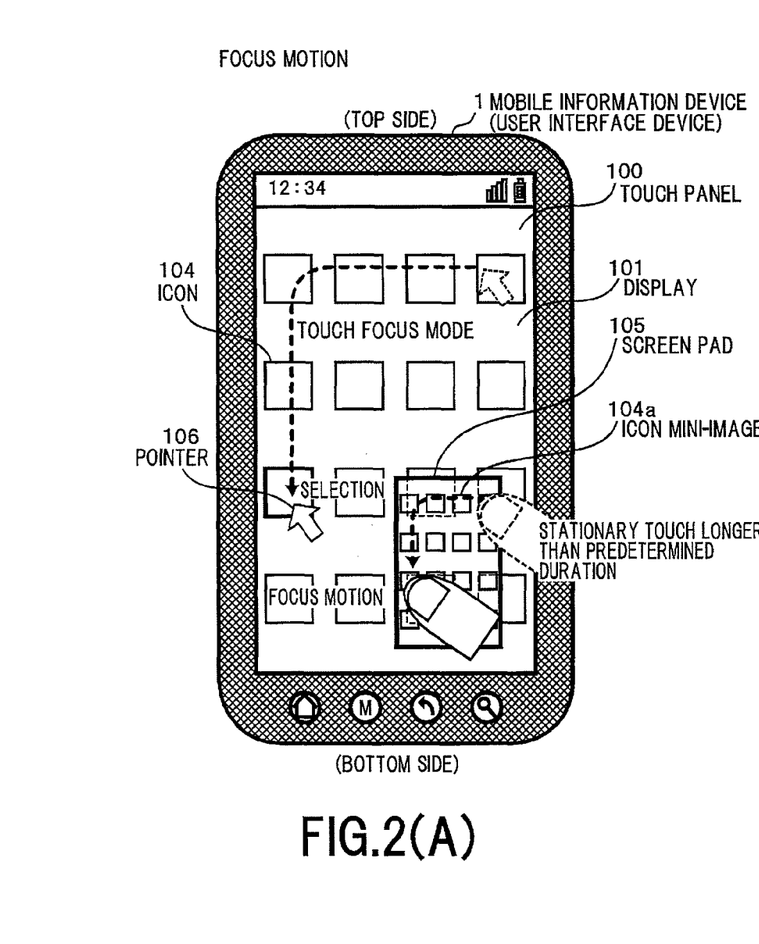
FIG. 2(A) is a front view illustrating the mobile information device depicted in FIG. 1, along with an example series of finger motions occurring during a focus motion.
Figure 2B:
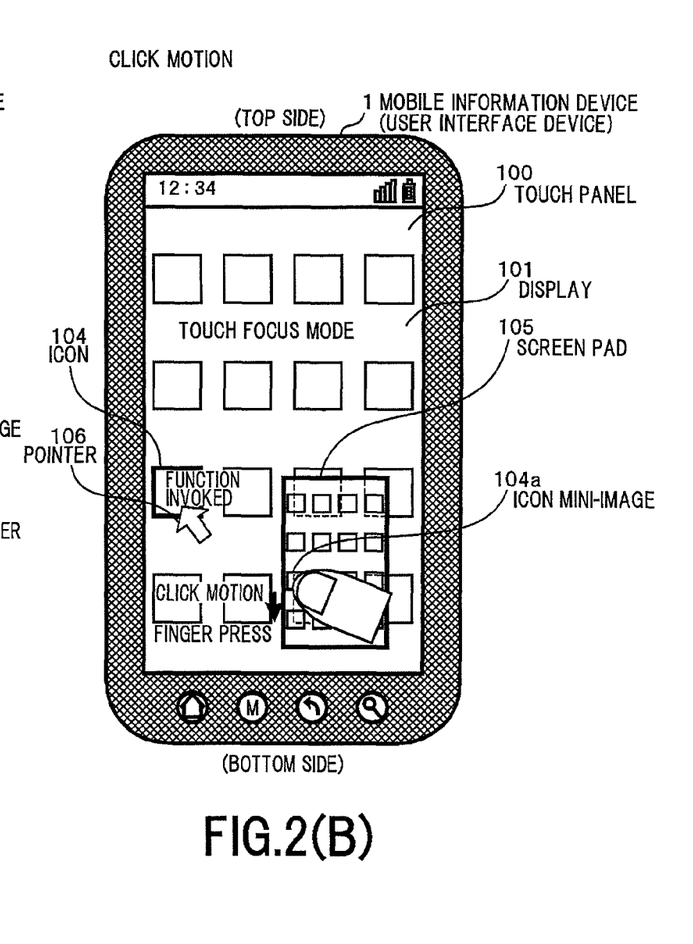
FIG. 2(B) is a front view illustrating the mobile information device depicted in FIG. 1, along with an example series of finger motions occurring during a click motion.

FIG. 2 shows front views illustrating the mobile information device 1, for explanation of the above-described focus and click motions occurring during the touch focus mode.

More specifically, FIG. 2(A) illustrates the mobile information device 1, along with an example series of finger motions occurring during the focus motion. To begin with, the touch focus mode will be described in which the focus motion occurs, by reference to this drawing.

In an example depicted in FIG. 2(A), the user touches the finger to the screen pad 105 (i.e., a region of the touch panel 100, which forms the screen pad 105), next stays the finger at the same touch point for a duration equal to or longer than a predetermined duration, and then slides the finger in touch with the screen pad 105 or swipes the finger across the screen pad 105. A stationary finger touch for a duration equal to or longer than the predetermined duration invokes the touch focus mode to allow both the original image containing the plurality of icons 104 and the reference image which is being displayed on the screen pad 105 and which contains the plurality of icon mini-images 104a corresponding to the icons 104, to be held stationary, without any movements in response to any possible subsequent movements of the finger.

As a result, the user can touch the finger singularly and successively to the plurality of icon mini-images 104a that are stationarily displayed on the screen pad 105, by sliding the finger in touch with the screen pad 105. As the finger slides, the pointer 106 slides on the screen of the display 101 as well, such that the pointer 106 singularly and successively points the plurality of icons 104 that are stationarily displayed on the screen of the display 101. In addition, a touch determining unit 122 (see FIG. 5), as described below, is configured to be operable also in the course of a finger-slide motion, to determine whether the finger touch point overlaps the region of any one of the icon mini-images 104 being displayed on the screen pad 105. Thus, it is the above-described touch focus mode that allows successive locations of the finger that moves in touch with the screen of the display 101, to be monitored over time, while images (i.e., the original image and the reference image) are stationarily displayed altogether on the screen of the display 101.

This touch focus mode is suitable where the user attempts to move the finger exactly up to the region of the desired icon mini-image 104a being displayed, which corresponds to the desired icon 104, by swiping the finger across the screen pad 105, while visually ascertaining whether or not the displayed image contains the desired icon 104.

Then, the conditions to be met for invoking the touch focus mode will be described. Initially, the user touches the finger to the screen pad 105. This point in time is denoted by $t_0$ ($t=t_0$). Next, the user makes the finger shift from a current status where the finger is held motionless and in touch with the screen pad 105, to a status where the finger starts sliding, without releasing from the screen pad 105. The starting time of this finger-slide motion is denoted by $t_{s2}$ ($t=t_{s2}$). In this scenario, it turns out that the finger touch point continuously stays still for a duration ($t_{s2}-t_0$). If the stationary-touch duration ($t_{s2}-t_0$) is equal to or longer than the predetermined duration $t_{TH}$ (i.e., ($t_{s2}-t_0$)≥$t_{TH}$) then an operation controller 125 (see FIG. 5) as described below invokes the touch focus mode. It is noted that the predetermined duration $t_{TH}$ may be set to, for example, 200 msec.

Referring back to FIG. 2(A), in the example illustrated in this drawing, the user moves the finger while swiping the finger across the displayed image, during the touch focus mode. Thereafter, the user finds the desired icon 104 and moves the finger up to a location in the region of the corresponding icon mini-image 104a being displayed. This motion performed during the touch focus mode by the user to render the finger touch point overlapped with the region of the desired icon 104 being displayed (i.e., a motion for rendering the position of the pointer 106 overlapped with the region of the desired icon 104 being displayed), will be hereinafter referred to as "focus motion."

The focus motion is a motion for the user to select the desired icon 104 not directly but, in the present embodiment, indirectly via the screen pad 105, and serves as a preparatory or run-up motion to help the user to correctly perform a subsequent motion for activating a function assigned to the desired icon 104.

It is noted that if the finger touch point becomes overlapped with the region of any one of the icon mini-images 104a being displayed, a haptic feedback arrangement 102 (see FIG. 4) as described below imparts to the user's finger, vibrations simulating or mimicking a tactile response that the finger would experience if pressing a physical push-button instead of a virtual button. This allows the user to ascertain, through tactile sensation, that the user's focus motion has been successfully accepted, with the user's more reliable and assured feeling when manipulating the device.

In this regard, an example of the vibrations simulating or mimicking a tactile response that the finger would experience if pressing a physical push-button is as follows:

First, points located within the region of each icon 104 being displayed, are each assigned height information to indicate that each icon 104 has virtual heights (i.e., virtual thicknesses measured vertical to the screen of the display 101).

Next, after the finger comes closer to the region of each icon 104 being displayed and enters the region, vibrations are imparted to the finger with the intensity varying depending on how steep the virtual slope of the region of each icon 104 being displayed, wherein the virtual slope is calculated based on the height information. This allows the user to have the same tactile sensation through the finger, that the user would experience if the user slides the finger while patting a projecting surface of a physical push-button.

FIG. 2(B) illustrates the mobile information device 1, along with an example series of finger motions occurring during the click motion. In an example depicted in this drawing, the finger moves up to the desired icon mini-image 104a in the course of the touch focus mode, and eventually, the finger touch point overlaps the region of the desired icon mini-image 104a being displayed. Along with this movement, the position of the pointer 106 becomes overlapped with the region of the desired icon 104 being displayed. If the user, at this point, presses the screen pad 105 with the finger with a greater force, then a function pre-assigned to the desired icon 104 is invoked. A motion of pressing the desired icon mini-image 104a (the touch panel 100) with the finger to invoke the function of the desired icon 104 will be hererinafter referred to as "click motion."

Then, the conditions to be met for recognizing a click motion will be described. During the touch focus mode, first, the finger touch point becomes overlapped with the region of the desired icon mini-image 104a being displayed. That is, a focus motion is performed. Subsequently, if the user, at this point, presses the touch panel 100 with the finger with a greater force, resulting in an increase of the pressing force $p_c$ up to a value equal to or greater than a pressing-force threshold $p_{TH}$ ($P_c \geq p_{TH}$), then this action is recognized as a click motion by the operation controller 125 described below (see FIG. 5), and the function of the desired icon 104 that has been selected by the user is invoked. For a motion to qualify as a click motion, the condition that the pressing force $p_c$ is equal to or greater than the pressing-force threshold $p_{TH}$ must be satisfied. It is noted that the pressing-force threshold $p_{TH}$ may be set to any value between 0.5 N and 2.0 N.

It is possible that, at this moment, the user's finger is imparted vibrations to make the user have the same tactile sensation that the user would experience if the user actually presses an alternative physical push-button, by means of the haptic feedback arrangement 102 (see FIG. 4) as described below. Hence, when the user performs a focus motion, the user experiences the vibrations to make the user imagine the use of a physical push-button through the vibrations, and when the user follows up with a click motion with the user's confidence that arises from the user's previous tactile sensation through the vibrations. In this state, if the user presses the desired icon mini-image 104a actually in the form of a virtual push-button, then the user's finger is further imparted a different form of vibrations from those of a click motion, to make the user have the same tactile sensation that the user would experience if the user actually presses an alternative physical push-button. As a result, in response to even the user's motions on the screen pad 105, the user can simulate a reliable and assured feeling that the user would experience if actually manipulating an alternative physical push-button.

As will be evident from the foregoing explanation made with reference to FIG. 2, in the present embodiment, the screen pad 105 makes it easy for the user to designate any position within the original image being displayed on the screen of the display 101, with one of the fingers of the user's one hand holding the mobile information device 1.

Further, the user, because of that, can easily perform a focus motion for selecting one of objects (e.g., one of the plurality of icons 104), by using one of the fingers of the user's one hand holding the mobile information device 1, and a click motion for invoking a function pre-assigned to the selected object. More specifically, a to-be-selected object is displayed on the screen of the display 101 at a location to which the finger is not accessible, the user can nevertheless perform the focus and click motions described above for the to-be-selected object, by touching the finger to an alternative object acting as a substitute for the to-be-selected object, which is displayed on the screen pad 105 at a position to which the finger is accessible.

In addition, the touch focus mode allows the user to swipe the finger across the screen of the display 101, which qualifies as a very simple motion. As a result, during the touch focus mode, when the user needs to manipulate with the finger the screen pad 105 having a display region smaller than the screen of the display 101, the user can nevertheless perform correct input-actions with ease, resulting in ensuring that the mobile information device 1 invokes the desired function.

In other words, the user's manipulation of not the screen of the display 101 but the screen pad 105 is advantageous in that the user can designate any position on the screen of the display 101, with the latent drawbacks that the user's maneuverability is worse due to the smaller size of the screen pad 105 than the screen of the display 101, but the latent drawbacks are suppressed, whether completely or partially, owing to the presence of the touch focus mode described above.

<Description of Drag Click Action>

Figure 3A:
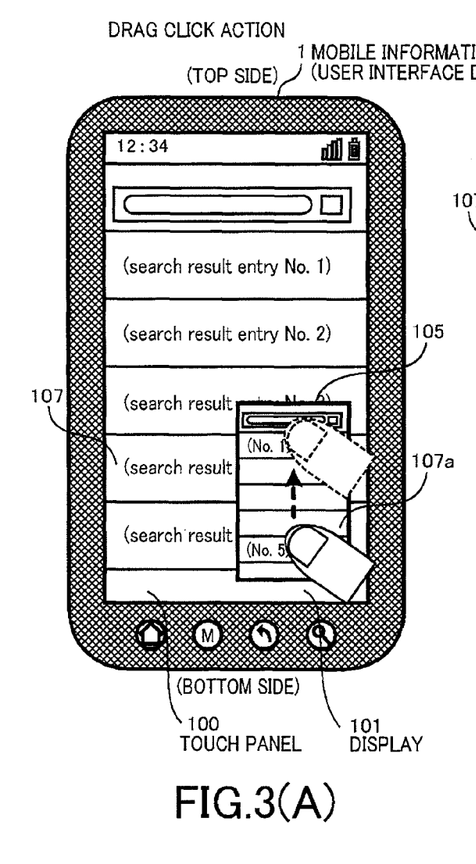
FIGS. 3(A), 3(B) and 3(C) are front views illustrating the mobile information device depicted in FIG. 1, along with an example series of finger motions occurring during a drag click motion.
Figure 3B:
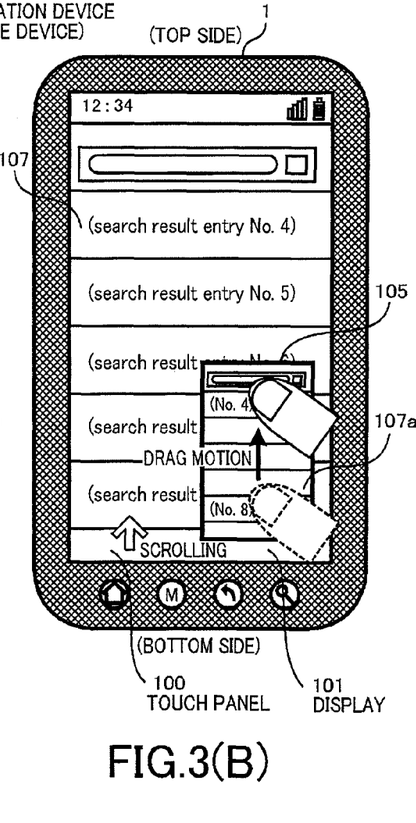
Figure 3C:
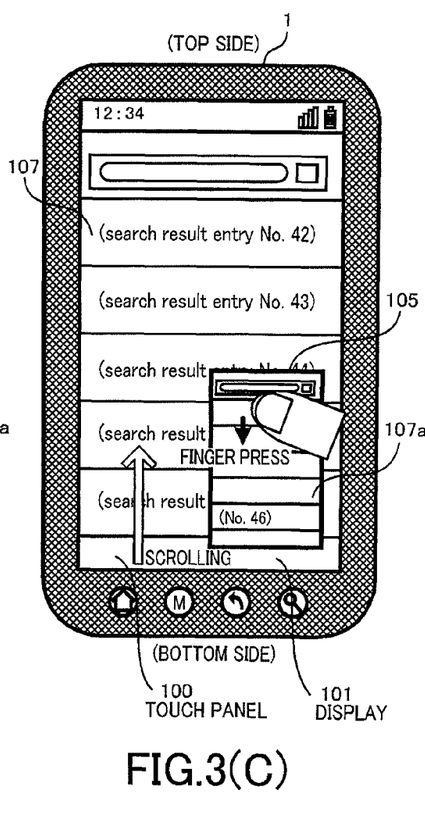

FIG. 3 shows front views illustrating the mobile information device 1, together with an example series of the user's finger motions occurring during a drag click action.

FIGS. 3(A) through 3(C) illustrate sets of time-series of finger motions occurring during a drag click action. To begin with, in an example depicted in FIG. 3(A), in response to a user's entry of a condition, a search is performed under the condition using a search engine, and an image indicative of a plurality of search results 107 is displayed on the screen of the display 101. In this implementation, only first through fifth search result entries 107 of the search result entries 107 totaled fifty are displayed on the screen of the display 101. In addition, in association with the first through fifth search result entries 107 being displayed on the screen of the display 101, first through fifth search result entry mini-images 107a are displayed on the screen pad 105 in the form of reduced duplicates or miniatures of the first through fifth search result entries 107.

The user touches the finger down to the screen pad 105, and immediately slides the finger upward with the finger in touch with the screen pad 105. That is, a so-called drag motion is performed. As illustrated in FIG. 3(B), this motion invokes upward scrolling of the reference image containing the plurality of search result entry mini-images 107a within the screen pad 105 in coordination with the finger's movement. As a result, for example, fourth through eighth search result entry mini-images 107a of all the search result entry mini-images 107a are displayed. Additionally, in link with this operation, the original image representative of the plurality of search result entries 107 are scrolled upward as well. As a result, for example, fourth through eighth search result entries 107 of all the search result entries 107 are displayed on the screen of the display 101.

Immediately after stopping that drag motion, the user presses the finger on the screen pad 105 (i.e., the region of the touch panel 100, which forms the screen pad 105) at the same position at which the finger had touched the screen pad 105 when the drag motion was stopped. A series of motions comprised of the drag motion and the subsequent finger-press motion qualifies as a drag click action. As a result of this drag click action, as illustrated in FIG. 3(C), subsequently to scrolling invoked by the drag action, the image containing the search result entry mini-images 107a on the screen pad 105 and the original image representative of the search result entries 107 are further scrolled at a variable scroll rate determined as a function of the status of the finger-press motion.

In that phase, the user can adjust the scroll rate by increasing or decreasing the intensity of the finger-press motion during scrolling. As a result, for example, forty-second through forty-sixth search result entries 107, which are ones of all the search result entries 107 which have not been displayed and have been located distant from the screen of the display 101, will move towards the screen and come into view in a shortened period of time. Thereafter, for example, the user can find and select forty-fifth search result entry 107 as the user's optimum search result entry (i.e., a desirable one or more of the plurality of search result entries 107), and then can execute the forty-fifth search result entry 104.

It is noted that the drag click action does not invoke the touch focus mode. As a result, a finger-press motion occurring after a drag motion never qualifies as a click motion described above with reference to FIG. 2(B). It is also noted that a scroll direction taken after a drag motion is preferably equal to a scroll direction taken during the drag motion. This allows the user to experience continued scrolling in the same scroll direction as a scroll direction designated by the user through the drag motion.

A finger-press motion occurring after a drag motion creates a pressing force $p_c$ applying to the touch panel 100. Depending on the magnitude of the pressing force $p_c$, the operation controller 125 (see FIG. 5) described below determines a scroll rate of scrolling to be invoked after the drag motion ends. The operation controller 125 may be designed to be operable, for example, when the pressing force $p_c$ is equal to or greater than a predetermined pressing-force threshold $p_{TH0}$, to determine the scroll rate such that the scroll rate increases directly proportional to a difference, which is to say, $(p_c-p_{TH0})$. In this implementation, as the user presses the finger with an increasing magnitude of force after a drag motion ends, the entire image is scrolled at a rate increasing directly proportional to the magnitude of the finger-pressing force.

It is noted that a haptic feedback arrangement 102 (see FIG. 4) described below can impart to the user's finger, haptic feedback changing in intensity depending on the scroll rate. For example, as the scroll rate becomes higher, the finger is imparted vibrations at an increasing intensity level. This allows the user to feel how high a scroll rate is through the intensity level of vibrations imparted to the finger, providing the user with realistic feel when the user operates the device.

As will be evident from the foregoing explanation made with reference to FIG. 3, in the present embodiment, the screen pad 105 makes it easy for the user to designate any position within the original image being displayed on the screen of the display 101, with one of the fingers of the user's one hand holding the mobile information device 1.

Additionally, this feature allows the user to perform, using one of the fingers of the user's one hand holding the mobile information device 1, a drag click action capable of scrolling at a user-adjustable rate. In this event, during the first drag motion, a finger's shorter-distance movement within the screen pad 105 provides the same results that would be provided if the finger's shorter-distance movement were replaced with a finger's longer-distance movement on the original image displayed on the screen of the display 101, in which the finger would be required to be moved to a destination beyond the finger's reach. Further, during the subsequent finger-press motion, a desired-distance scrolling operation can be provided as a result of only the user's simple action of pressing the screen pad 105 with the finger at a position within the finger's reach, in a shortened period of time required, without requiring the user to perform frequent and successive drag motions.

In addition, the drag click action is a very simple motion that the user can perform without releasing the finger from the screen. As a result, this motion performed on the screen pad 105 having a relatively small size assuredly invokes a desired operation of the mobile information device 1, without any loss in the maneuverability of the mobile information device 1.

Figure 4:
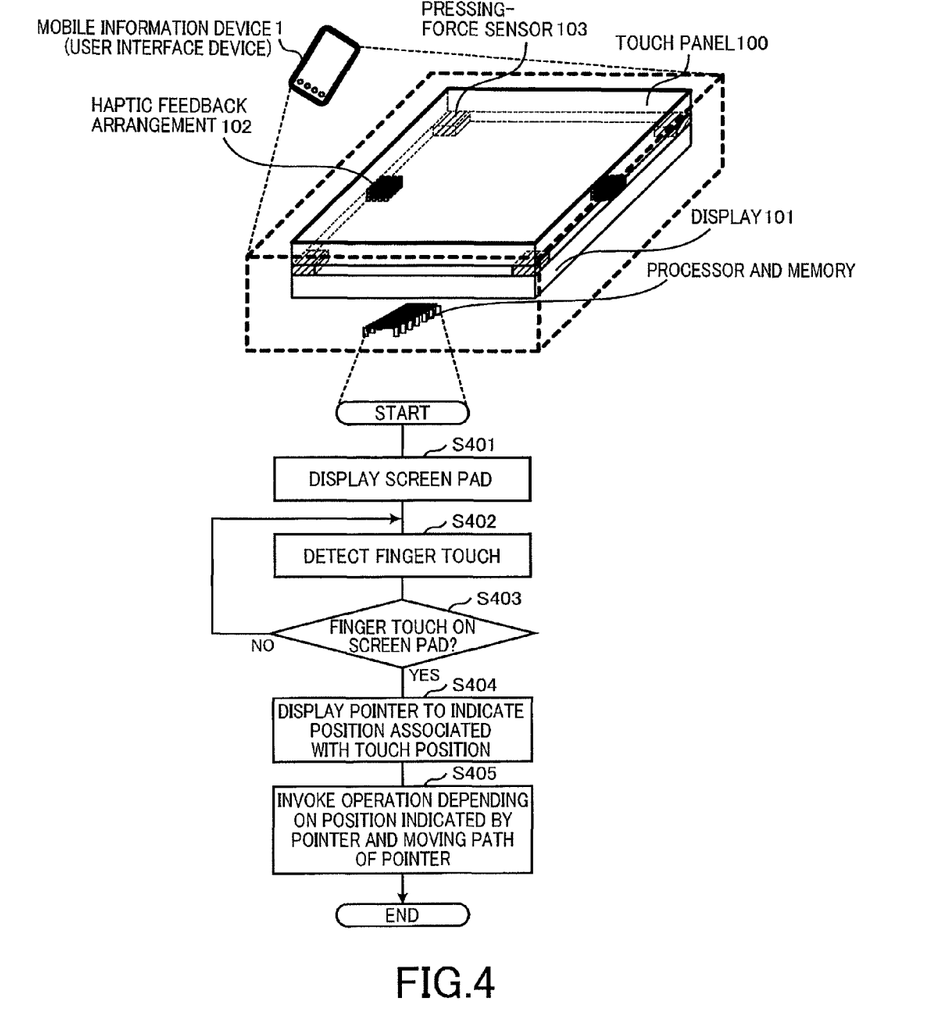
FIG. 4 is a perspective view schematically illustrating the construction of the mobile information device depicted in FIG. 1, together with a flowchart schematically illustrating an implementing example of an input-actions processing method performed using the screen pad depicted in FIG. 1.
Figure 5:
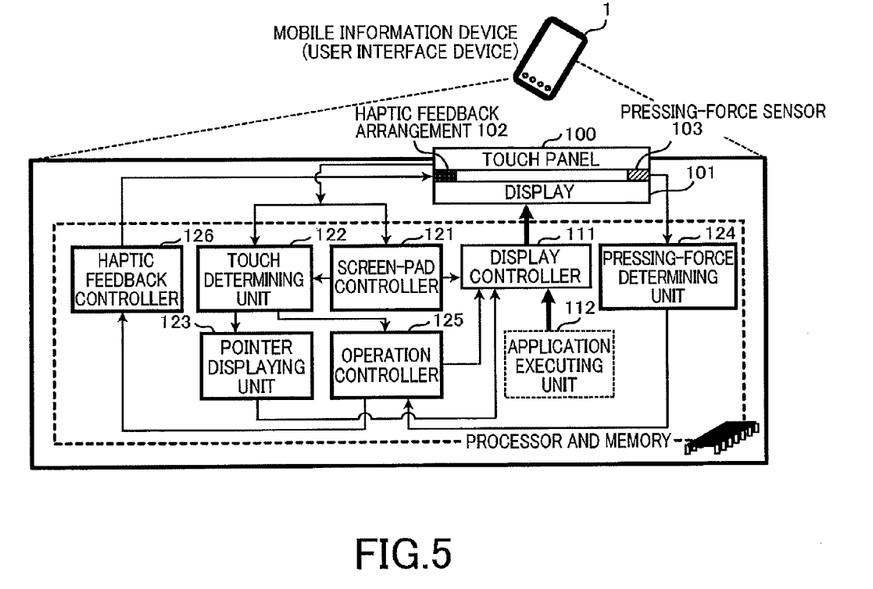
FIG. 5 is a functional block diagram illustrating an implementing example of the mobile information device depicted in FIG. 1.

FIG. 4 is a perspective view schematically illustrating the construction of the mobile information device 1, together with a flowchart illustrating an implementing example of an input-actions processing method performed using the screen pad 105 built in the mobile information device 1. In addition, FIG. 5 is a functional block diagram illustrating an implementing example of the mobile information device 1.

As illustrated in FIG. 4, the mobile information device 1 is constructed to include the touch panel 100, the display 101, the haptic feedback arrangement 102, a pressing-force sensor 103, and a processor and memory. The processor and memory executes a program for performing the input-actions processing method, to thereby provide the function of the program.

For the processor and memory, as well known, a processor and a memory together constitute a computer. The memory among them stores the program for performing the input-actions processing method. The memory is an example of a computer-readable and non-transitory storage medium having stored therein the program.

The display 101 is configured to display an image on a display screen. In addition, the touch panel 100 is disposed over the display screen of the display 101, and is configured to sense and output successive locations of the user's finger touch point on the display screen over time. The touch panel 100 may be in the form of a projected capacitive touch panel, a surface capacitive touch panel, a resistive touch panel, an ultra-sonic surface acoustic wave touch panel, an infra-red touch panel, or the like.

The haptic feedback arrangement 102 is configured to vibrate the touch panel 100, to thereby impart to the user's finger held in touch with the touch panel 100, haptic feedback as a response to the user's particular motions. An example of the haptic feedback arrangement 102 operates in response to the user's focus motion, click motion and/or drag click action, described above, to impart to the finger vibrations having a form and an intensity level which are variable as a function of the status of the associated finger motion that occurred. The haptic feedback arrangement 102 may be, for example, in the form of a piezoelectric actuator formed with piezoelectric materials such as PZT (Lead Zirconate Titanate).

The pressing-force sensor 103 is used to detect a pressing force $p_c$ with which the user presses the touch panel 100 with the finger. In an example, the pressing-force sensor 103 is disposed at each of four corners of the touch panel 100, and the pressing force $p_c$ is measured by averaging four component forces with which the pressing-force sensors 103 are pressed at the four corners, respectively, by deflection created in the touch panel 100 with the pressing finger. The pressing-force sensor 103(s) outputs a pressing-force signal indicative of the detected pressing force $p_c$, which enters a pressing-force determining unit 124 described below. In addition, the pressing-force sensor 103 can be used to serve as a haptic feedback arrangement, instead of or in addition to the haptic feedback arrangement 102 formed with a piezoelectric actuator.

The pressing force $p_c$ with which the user presses a touch screen of the touch panel 100 is an example of a physical quantity expressing the intensity of a finger touch on the touch screen. The intensity of a finger touch can be expressed by, instead of the pressing force $p_c$, the size of an area in which the finger touches the touch screen, a change in electrical property in response to a finger touch on the touch screen, or a change in temperature in response to a finger touch on the touch screen. Therefore, the present embodiment may be practiced in modified modes by replacing the pressing force $p_c$ with an alternative equivalent physical quantity.

The above-mentioned processor and memory is configured to input from the touch panel 100 a touch-location signal indicative of the location of a finger touch point, and input the pressing-force signal from the pressing-force sensor 103, identify the user's finger motions performed, based on the inputted signals, and invoke an operation associated with the status of the finger motion performed. In particular, the processor and memory inputs the touch-location signal and the pressing-force signal both of which occurred when the user touched the finger to the screen pad 105, and renders the pointer 106 displayed on the screen of the display 101 at a location associated with the finger touch location. Subsequently, the processor and memory invokes an operation associated with the initial position indicated by the pointer 106 and the path along which the pointer 106 moved after the initial location. Then, with reference to FIG. 5, the configuration and functions of the processor and memory will be described.

As illustrated in FIG. 5, the processor and memory is constructed to incorporate a screen-pad controller 121, the touch determining unit 122, a pointer displaying unit 123, the pressing-force determining unit 124, the operation controller 125, the haptic feedback controller 126, a display controller 111, and an application executing unit 112.

The screen-pad controller 121 instructs the display controller 111 to display the screen pad 105 within the screen of the display 101, such that the screen pad 105 displays the same image as the entire original-image being displayed on the screen of the display 101, with a smaller scale factor or in reduction, in a manner that the reduced image is overlaid with the original image.

It is noted that the activation of the screen pad 105 (entry into the display mode of the screen pad 105) may be performed in response to delivery of request information indicative of a request for displaying the screen pad 105, from the user to the screen-pad controller 121, by means of, for example, as described above, the finger's activation of a particular icon, the finger-depressing motion for a particular physical button attached to the mobile information device 1, or the like.

Further, the screen-pad controller 121 determines the position at which the screen pad 105 to be displayed within the screen of the display 101, and then instructs the display controller 111 to display the screen pad 105 at the determined position.

It is noted that the user can move the screen pad 105 (i.e., the display position of the screen pad 105) by dragging the screen pad 105 using the finger by, for example, as described above, touching the finger to one of the edge areas of the screen pad 105 or to a predetermined area and then moving the finger in touch. The screen-pad controller 121 inputs information indicative of the user's motion for moving the screen pad 105, and then determines the position at which the screen pad 105 is to be displayed on the screen of the display 101 and moves the screen pad 105 to the determined position.

Further, the screen-pad controller 121 determines a reduction scale factor with which the original image is to be reduced to create the reference image of the screen pad 105, and instructs the display controller 111 to display the reference image with the determined reduction scale factor.

It is noted that the user can adjust the reduction scale factor by means of, for example, touching the finger to a marker or slider displayed on the screen pad 105 at selected one or more of the four corners of the screen pad 105, or at an intermediate point on a selected one of straight edge areas of the screen pad 105, and then moves the marker in touch. The screen-pad controller 121 inputs information indicative of the user's motion for adjusting the reduction scale factor, and then determines the adjustment value of the reduction scale factor.

The touch determining unit 122 inputs the touch-location signal from the touch panel 100, inputs position information indicative of the position of the screen pad 105, from the screen-pad controller 121, and then determines whether the finger has been touched to the screen pad 105 being displayed. Further, the touch determining unit 122 outputs the determination result to the operation controller 123. In addition, it is preferable that the touch determining unit 122 is operable during the touch focus mode described above, to determine whether the finger touch point on the screen pad 105 is overlapped with any one of the regions of the respective icon mini-images 104a being displayed, and output the determination result to the operation controller 123.

The pointer displaying unit 123 inputs the determination result and information of the finger touch location on the screen pad 105, from the touch determining unit 122, and then instructs the display controller 111 to display the pointer 106 within the screen of the display 101 at a position corresponding to the finger touch location on the screen pad 105.

The pressing-force determining unit 124 inputs the pressing-force signal from the pressing-force sensor 103, and then determines whether the pressing force $p_c$ with which the finger presses the touch panel 100 is equal to or larger than the predetermined pressing-force threshold $p_{TH}$ (or $p_{TH0}$). Further, the pressing-force determining unit 124 outputs the determination result to the operation controller 125.

The operation controller 125 inputs the determination result and information of the finger touch location within the screen pad 105, from the touch determining unit 122. The operation controller 125 is operable based on the inputted information to invoke the same operation that would be invoked if the user touched the finger to the initial position of the pointer 106, and then swiped the finger across the original image displayed on the screen of the display 101, so as to track the subsequent movement of the pointer 106 or along the path that the pointer took after the initial position.

Additionally, the operation controller 125 instructs the display controller 111 to display an image associated with the invoked operation. Further, it is preferable that, if the touch determining unit 122 determines that a stationary finger-touch with the screen pad 105 has continued for a duration equal to or longer than the predetermined duration $t_{TH}$, then the operation controller 125 invokes the touch focus mode described above.

It is also preferable that, if the pointer 106 points any one of the regions of the respective objects (e.g., any one of the icons 104) being displayed, during the touch focus mode, then the operation controller 125 determines that the focus motion described above has been performed. It is still also preferable that, if the pointer 106 points anyone of the regions of the respective objects being displayed, and the pressing force $p_c$ is equal to or larger than the predetermined threshold $p_{TH}$, then the operation controller 125 determines that the click motion described above has been performed. In any event, the operation controller 125 invokes an operation associated with the performed one of motions.

The haptic feedback controller 126 inputs operation-instructing information from the operation controller 125. The haptic feedback controller 126 then controls the haptic feedback arrangement 102 to impart an associated haptic feedback to the user's finger, based on the inputted operation-instructing information.

The display controller 111 inputs application execution information from the application executing unit 112, and commands the display 101 to display on the display screen an image associated with the application being executed. In addition, the display controller 111 inputs the operation-instructing information from the operation controller 125, and commands the display 101 to display an image associated with the operation indicated by the inputted operation-instructing information.

Referring next to a flowchart depicted in FIG. 4, an implementing example of the input-actions processing method to be executed by the processor and memory using the screen pad 105 will be described.

As illustrated in FIG. 4, as a first step, the screen-pad controller 121 operates to display the screen pad 105 within the screen of the display 101, such that the screen pad 105 displays the same image as the entire original-image being displayed on the screen of the display 101, with a smaller scale factor or in reduction, in a manner that the reduced image is overlaid with the original image (Step S401). Subsequently, the touch panel 100 detects a finger touch (Step S402). Thereafter, the touch determining unit 122 determines whether the finger has been touched to the screen pad 105 (Step S403).

If, next, the touch determining unit 122 determines that the finger has been touched to the screen pad 105, then the pointer displaying unit 123 operates to display the pointer 106 on the screen of the display 101, in order to point a location associated with the finger touch location within the screen pad 105 (Step S404). Subsequently, the operation controller 125 invokes the same operation that would be invoked if the user touched the finger to the screen of the display 101 at the initial position of the pointer 106, and then swiped the finger across the original image displayed on the screen of the display 101, so as to track the subsequent movement of the pointer 106 (Step S405). More specifically, for example, the operation controller 125 invokes an operation associated with the category of one of finger motions which the user has performed, for example, the touch focus mode, the focus motion, the click motion or the drag click action, as described above.

As will be evident from the foregoing detailed description, the user interface device, the user-actions processing method and the program, all of which are constructed according to the present embodiment, allow the user in an attempt to manipulate the touch panel 100 with a finger of the user's one hand holding the mobile information device 1, to touch the finger to the screen pad 105 and manipulate the touch panel 100, while observing the pointer 106, with the aim of locating the pointer 106 at a desired position within the screen of the display 101.

As a result, the user can easily designate any desired position within the screen of the display 101, using a finger of the user's one hand holding the mobile information device 1, even when it is difficult for the user to directly and correctly touch the finger to the screen of the display 101 at the desired position.

While an illustrative mode for carrying out the present invention has been described above in detail with reference to the drawings, these modes are just an example, and the present invention may be carried out in alternative modes, which begin with the modes described in the section titled "Summary of the Invention," or which are obtained by making various modifications and improvements to the above-described modes, in view of the knowledge of those skilled in the art.

The invention claimed is:

1. A user interface device configured to perform: (a) a display function of displaying an image on a display screen, and (b) a touch panel function of outputting successive locations of the user's finger touch point on a touch screen over time, the user interface device comprising:
    a screen-pad controller configured to display, while displaying an original image on the display screen, a reference image on the display screen forming a screen pad, the screen pad being defined as an in-screen touch pad, such that the reference image has a reduced size with respect to the original image to partially overlay the reference image with the original image, the original image containing a plurality of user-selectable first objects, the reference image containing a plurality of user-selectable second objects respectively corresponding to at least each of the plurality of first objects; and
    an operation controller configured to, in response to a user's finger touch with the screen pad, (i) detect one of the plurality of second objects on the screen pad, which has been selected by the user's finger touch, and (ii) recognize the user's input based on one of the plurality of first objects, which corresponds to the selected second object.

2. The user interface device according to claim 1, wherein the operation controller is configured to (i) display a pointer on the original image being displayed on the display screen in order to indicate a location on the display screen that corresponds to a position at which the user has touched the finger to the screen pad, and (ii) invoke the same operation that will occur in the user interface device if the user touches the finger to the display screen at a same position as an initial position that the pointer took, and then swipes the finger across the original image being displayed on the display screen, along a same path that the pointer took after the initial position.

3. The user interface device according to claim 1, wherein the screen pad is displayed on the display screen at a position that allows the user, who is holding the user interface device using the user's one hand in an attempt to manipulate the user interface device using the one hand of the user, to reach any location on the screen pad using a finger of the one hand of the user.

4. The user interface device according to claim 1, wherein
    the operation controller is configured to, in response to an event occurring in which a stationary-touch duration during which a finger touch point is held substantially stationary on the screen pad is equal to or longer than a predetermined duration, to activate a touch focus mode for monitoring successive locations of the finger touch point on the screen pad, with the plurality of second objects held stationarily on the display screen when the finger moves on the screen pad.

5. The user interface device according to claim 4, wherein the operation controller is configured to: (i) display a pointer on the original image being displayed on the display screen, to indicate a location on the display screen, which corresponds to a position at which the user has touched the finger to the screen pad, and (ii) in response to an event occurring in which, during the touch focus mode, the pointer indicates one of the plurality of first objects included in the original image, determine that the user has performed a focus motion to select the one first object, and then invoke an operation associated with the one selected first object.

6. The user interface device according to claim 4, wherein
    the operation controller is configured to: (i) display a pointer on the original image being displayed on the display screen, to indicate a location on the display screen, which corresponds to a position at which the user has touched the finger to the screen pad, and (ii) in response to an event occurring in which, during the touch focus mode, the pointer indicates one of the plurality of first objects included in the original image, and in which a pressing-force with which the finger presses the touch panel is equal to or larger than a predetermined threshold, determine that the user has performed a click motion to invoke an function pre-assigned to the one first object, and then invoke an operation associated with the one first object.

7. The user interface device according to claim 6, further comprising:

a haptic feedback arrangement configured to impart haptic feedback to the user's finger that is in touch with the touch panel; and a haptic feedback controller configured to control the haptic feedback arrangement to impart the haptic feedback to the finger via the touch panel.

8. The user interface device according to claim 1, wherein the operation controller, in response to an event occurring in which, before a predetermined length of time elapses after the finger starts being touched to the screen pad, the finger starts moving in touch with the screen pad, and then the finger stops moving, is configured to determine that the user has performed a drag click motion in the form of a succession of a first motion for moving one of the plurality of first objects in coordination with a movement of the finger, and a second motion for further moving the one of the plurality of first objects at a rate variable as a function of a magnitude of the pressing force after the drag motion ends, and then invoke an operation associated with the drag click motion.

9. The user interface device according to claim 1, wherein the operation controller is configured to, in response to the user touching the finger to the display screen at a location away from a region of the screen pad being displayed, invoke a same operation that would be invoked in the user interface device if the user touched the finger to the display screen at a same location as the away location in an absence of the screen pad on the display screen.

10. The user interface device according to claim 1, wherein
the screen-pad controller is configured to change between (i) a display mode allowing the screen pad to be displayed, and (ii) a non-display mode not allowing the screen pad to be displayed, depending on the user's manipulation, and in the non-display mode, the user is allowed to directly select one of the plurality of first objects by touching the finger to the original image.

11. The user interface device according to claim 1, wherein the screen-pad controller is configured to adjust a reduction scale factor with which the original image is to be reduced to create the reference image of the screen pad, depending on the user's manipulation.

12. The user interface device according to claim 1, wherein
the plurality of first objects include a plurality of user-selectable original icons, and the plurality of second objects include a plurality of user-selectable miniature icons obtained by reducing the corresponding respective original icons with or without image simplification.

13. A process of processing a user's inputs on a user interface device configured to: (i) display an image on a display screen, and (ii) recognize the user's input by the user's finger touch on a touch screen in association with the displayed image, the process comprising:
displaying an original image on the display screen, the original image containing a plurality of user-selectable first objects;

forming a screen pad defined as an in-screen touch pad, such that a reference image having a reduced size with respect to the original image being displayed is displayed on the screen pad within the display screen, in a manner that the reference image is partially overlaid with the original image, in a translucent mode that renders the original image visible through the reference image, or an opaque mode that fails to render the original image visible through the reference image, the reference image containing a plurality of user-selectable second objects respectively corresponding to at least each of the plurality of first objects; and in response to the user touching the finger to the screen pad, detecting one of the plurality of second objects on the screen pad, which has been selected by the user's finger touch, as a selected second object, and recognizing the user's input based on one of the plurality of first objects, which corresponds to the selected second object.

14. A non-transitory computer readable storage medium configured to store a program that when executed by a computer performs the process according to claim 13.

15. The process according to claim 13, wherein
the process includes changing between (i) a display mode allowing the screen pad to be displayed, and (ii) a non-display mode not allowing the screen pad to be displayed, depending on the user's manipulation, and in the non-display mode, the user is allowed to directly select one of the plurality of first objects by touching the finger to the original image.

16. The process according to claim 13, further including adjusting a reduction scale factor with which the original image is to be reduced to create the reference image of the screen pad, depending on the user's manipulation.

17. The process according to claim 13, wherein
the plurality of first objects include a plurality of user-selectable original icons, and the plurality of second objects include a plurality of user-selectable miniature icons obtained by reducing the corresponding respective original icons with or without image simplification.

* * * * *